United States Patent [19]

Madison et al.

[11] Patent Number: 5,124,432
[45] Date of Patent: Jun. 23, 1992

[54] BRANCHED POLYBENZAZOLE POLYMER AND METHOD OF PREPARATION

[75] Inventors: Norman L. Madison; William J. Harris, both of Midland, Mich.

[73] Assignee: The Dow Chemical Company, Midland, Mich.

[21] Appl. No.: 401,346

[22] Filed: Aug. 31, 1989

[51] Int. Cl.⁵ .............................................. C08G 73/22
[52] U.S. Cl. .................................... 528/188; 524/600; 524/606; 524/611; 524/612; 528/179; 528/183; 528/185; 528/331; 528/342
[58] Field of Search ............... 528/188, 183, 185, 193, 528/179, 331, 342; 524/600, 606, 611, 612

[56] References Cited

U.S. PATENT DOCUMENTS

| | | | |
|---|---|---|---|
| 3,360,502 | 12/1967 | Loncrini | 260/78 |
| 3,387,058 | 6/1968 | Levine | 260/823 |
| 3,574,170 | 4/1971 | Chenevey | 260/78.4 |
| 3,644,286 | 2/1972 | Odier et al. | 528/185 |
| 3,644,287 | 2/1972 | Odier et al. | 528/185 |
| 3,644,288 | 2/1972 | Odier et al. | 528/185 |
| 3,783,137 | 1/1974 | Gerber | 260/47 |
| 4,017,466 | 4/1977 | Milligan et al. | 260/78 |
| 4,359,567 | 11/1982 | Evers | 528/179 |
| 4,533,692 | 8/1985 | Wolfe et al. | 524/417 |
| 4,533,693 | 8/1985 | Wolfe et al. | 524/417 |
| 4,533,724 | 8/1985 | Wolfe et al. | 528/313 |
| 4,578,432 | 3/1986 | Tsai et al. | 525/432 |
| 4,703,103 | 10/1987 | Wolfe et al. | 528/179 |
| 4,766,244 | 8/1988 | Lysenko | 564/418 |
| 4,806,688 | 2/1989 | Inbasekaran et al. | 564/443 |
| 4,835,246 | 5/1989 | Tsai et al. | 528/337 |

OTHER PUBLICATIONS

Hwang et al., "Solution Processing and Properties of Molecular Composite Fibers ad Films," 23 *Poly. Eng. & Sci.* 784 (1984).
Hwang et al., "Composites on a Molecular Level: Phase Relationships, Processing, and Properties," B22(2) *J. Macromol. Sci. & Phys.* 231 (1983).
"Polybenzothiazoles and Polybenzoxazoles", 11 Ency. Poly. Sci. & Eng., 601 (J. Wiley & Sons, Inc. 1988).
Derwent Abstract 48422Y/27 (SU 531,818) (1976) (Dec. 1976).
Derwent Abstract 46447Y/26 (SU 502,912) (1976) (Dec. 1976).
Derwent Abstract 016720-A (DT-2,228,067) (1972) (Dec. 1972).
Derwent Abstract 71535X/38 (J7 6028-419) (1976) (Aug. 1976).

*Primary Examiner*—Harold D. Anderson
*Attorney, Agent, or Firm*—John L. Wood

[57] ABSTRACT

The invention is a process for making novel branched polybenzazole polymers and the polymers formed thereby. Novel compounds are also disclosed that are useful as branching agents in making the branched polybenzazole polymers. The branched polymers synthesized by the process can be formed into strong, light articles such as fibers and films.

22 Claims, No Drawings

BRANCHED POLYBENZAZOLE POLYMER AND METHOD OF PREPARATION

STATEMENT OF GOVERNMENT INTEREST

This invention was made with support of the United States Government under Contract F33615-85-C-5113 awarded by the Department of the Air Force. The Government has certain rights to this invention.

BACKGROUND OF THE INVENTION

The present invention concerns the art of PBZ polymers and in particular branched compositions containing those polymers.

PBZ polymers (see definition for PBZ polymers herein) are commonly known as polybenzoxazoles, polybenzothiazoles and polybenzimidazoles. PBZ polymers and their synthesis are described in detail in the following patents and article, the teachings of which are incorporated herein by reference: Wolfe et al., *Liquid Crystalline Polymer Compositions, Process and Products,* U.S. Pat. No. 4,703,103 (Oct. 27, 1987); Wolfe et al., *Liquid Crystalline Polymer Compositions, Process and Products,* U.S. Pat. No. 4,533,692 (Aug. 6, 1985); Wolfe et al., *Liquid Crystalline Poly(2,6-Benzothiazole) Compositions, Process and Products,* U.S. Pat. No. 4,533,724 (Aug. 6, 1985); Wolfe et al., *Liquid Crystalline Polymer Compositions, Process and Products,* U.S. Pat. No. 4,533,693 (Aug. 6, 1985); Evers, *Thermooxidatively Stable Articulated P-Benzobisoxazole and P-Benzobisthiazole Polymers,* U.S. Pat. No. 4,359,567 (Nov. 16, 1982); Tsai et al., *Method for Making Heterocyclic Block Copolymers,* U.S. Pat. No. 4,578,432 (Mar. 25, 1986); and "Polybenzothiazoles and Polybenzoxazoles", 11 *Ency. Poly. Sci. & Eng.,* 601–635 (J. Wiley & Sons, Inc. 1988).

PBZ polymers have generated considerable research interest due to their unique physical properties. PBZ polymers can exhibit remarkable high-temperature stability, high tensile strength and high tensile modulus. PBZ polymers are resistant to harsh environments and, therefore, useful for military, aerospace, automotive, and other applications requiring high performance materials.

Due to their unique thermal and environmental stability, PBZ polymers can be difficult to fabricate into useful articles of manufacture, especially where the PBZ polymer is a rigid-rod PBZ polymer. Rigid-rod PBZ polymers are those polymers which consist of essentially rectilinear polymer structures. In general, useful articles are made from both rigid-rod and non-rigid-rod PBZ polymers by dissolving them in a suitable solvent, typically polyphosphoric acid, to form either anisotropic liquid crystalline compositions or isotropic compositions, the nature of the resulting composition depending upon the PBZ polymer in question and its concentration. These compositions can be processed by known methods to form fibers and films. The fibers can be incorporated as a reinforcing agent within a thermosetting polymer, such as an epoxy resin, to form a composite that can be converted into strong, light articles of manufacture.

SUMMARY OF THE INVENTION

One aspect of the present invention is a process for making branched PBZ polymers. The process comprises contacting, in the presence of at least one dehydrating solvent and under conditions sufficient to form a branched PBZ polymer, at least one PBZ monomer with at least one branching agent. The PBZ monomer(s) and the branching agent(s) are present in amounts sufficient to form a branched PBZ polymer. Each PBZ monomer contains at least two azole-forming moieties and is capable of forming a PBZ polymer in a condensation polymerization reaction. Each branching agent comprises a base structure moiety which has bonded thereto at least three moieties, each of which, when reacted with an azole-forming moiety from a PBZ monomer, forms an azole ring, the branching agent being present in an amount which will produce a branched PBZ polymer substantially free of cross-linking.

A second aspect of the present invention is a branched PBZ polymer. The branched PBZ polymers comprise at least one branching agent base structure moiety having a plurality of PBZ polymer branches bonded thereto.

A third aspect of the present invention is a group of branching agents useful in making branched PBZ polymers. The branching agents are compounds selected from the group consisting of:

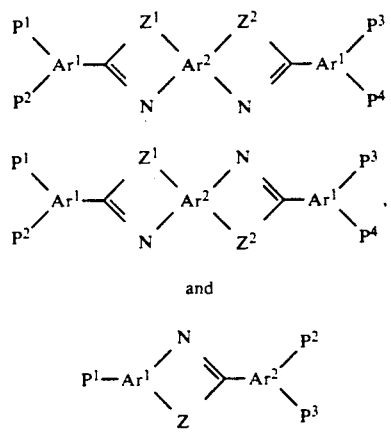

and wherein:
$Ar^1$ is a first aromatic group;
$Ar^2$ is a second aromatic group;
$P^{1-4}$ are independently selected from the group consisting of electron-deficient carbon groups and o-aminobasic moieties; and
$Z$, $Z^1$ and $Z^2$ are independently selected from the group consisting of is O, S or NR, R being hydrogen, an aliphatic group containing up to about 12 carbon atoms or an aromatic group containing up to about 18 carbon atoms.

A fourth aspect of the present invention is a dope comprising at least one solvent and at least one branched PBZ polymer.

A fifth aspect of the present invention is an article of manufacture comprising at least one branched PBZ polymer.

DETAILED DESCRIPTION OF THE INVENTION

I. Definitions

The following terms are used repeatedly in this application and have the meanings and preferred embodiments set out in the corresponding definitions, unless otherwise specified.

Aromatic group (Ar)—An aromatic group is an aromatic ring or ring system as defined herein. The size of the aromatic group is not critical, so long as the aromatic group does not significantly hinder reaction of the moiety in which it is incorporated. Each aromatic group suitably comprises no more than about 18 carbon atoms, preferably no more than about 12 carbon atoms and most preferably no more than about 6 carbon atoms. Each aromatic group may be heterocyclic, but is preferably carbocyclic and more preferably hydrocarbyl. If the aromatic group is heterocyclic, the heteroatom is preferably nitrogen.

Unless otherwise specified, an aromatic group broadly refers to arenes, a major group of unsaturated cyclic hydrocarbons containing one or more rings, which may comprise a single aromatic ring, a fused ring system or an unfused ring system containing a plurality of aromatic rings. Where two or more rings are present, they may be fused, as in the case of polynuclear compounds such as naphthalene and anthracene, or covalently bonded to each other either directly, as in the case of a biphenyl moiety, or by way of an intermediate moiety. Suitable intermediate moieties comprise, for example, a carbonyl group, a sulfonyl group, an oxygen atom, a sulfur atom, an alkyl group, an aromatic group, or combinations thereof. Each aromatic group is preferably a single 6-membered ring, and most preferably a benzene ring.

Aromatic groups are generally inert with respect to the condensation polymerization reaction. Each aromatic group may have substituents attached thereto which are stable with respect to reactants and solvents used in PBZ polymerization reactions and do not interfere with reactivity of azole-forming moieties attached to the aromatic group. Examples of suitable substituents include hydrogen, halogens, alkoxy moieties, aryloxy moieties and alkyl groups. Substituents are preferably hydrogen, alkyl groups having no more than about 6 carbon atoms, and halogens.

Azole ring—An oxazole, thiazole or imidazole ring as illustrated in Formula 1. The carbon atom bonded to both the nitrogen atom and the Z moiety is the 2-carbon. The Z moiety is O, S, or NR, R being selected from the group consisting of hydrogen, aromatic groups containing up to about 18 carbon atoms, and aliphatic groups containing up to about 12 carbon atoms. R is preferably hydrogen or an alkyl group, and most preferably is hydrogen. Where R is an alkyl group, it suitably comprises no more than about 6 carbon atoms, preferably no more than about 4 carbon atoms and most preferably no more than about 1 carbon atom. Each azole ring is preferably an oxazole ring or thiazole ring, and more preferably an oxazole ring. In PBZ polymers, the 4- and 5-carbons of each azole ring are typically fused with an aromatic group, as shown in Formula 1.

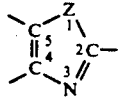

Azole-forming moiety—An "o-amino-basic moiety" or "electron-deficient carbon group" as those terms are defined herein. An azole ring is formed by the reaction of an electron-deficient carbon group and an o-amino-basic moiety.

Branching agent—A reactant, defined in greater detail hereinafter, which can react with at least one PBZ monomer in a dehydrating solvent to form branched PBZ polymers.

Dehydrating Solvent—Any non-oxidizing liquid solvent capable of placing at least a portion of the branching agents, PBZ monomers and resulting branched PBZ polymer into solution during a PBZ polymerization reaction. The dehydrating solvent must not substantially oxidize reactants dissolved therein which contain o-amino-basic moieties. The dehydrating solvent must also compensate for water formed during the polymerization resulting from an azole ring forming reaction between an electron-deficient carbon group and an o-amino-basic moiety. It is also believed that dehydrating solvents facilitate azole ring formation. Examples of suitable dehydrating solvents include strong mineral acids such as sulfuric acid, methanesulfonic acid with added phosphorous pentoxide ($P_2O_5$), trifluoromethyl sulfonic acid, polyphosphoric acid and mixtures thereof.

The dehydrating solvent is preferably polyphosphoric acid or a mixture of methanesulfonic acid with added $P_2O_5$. The polyphosphoric acid suitably has a minimum $P_2O_5$ content of at least about 73% by weight of solution, and desirably at least about 75%. The maximum $P_2O_5$ content is desirably less than about 90% and preferably is less than about 86% by weight of solution. The weight ratio of methanesulfonic acid to $P_2O_5$ in mixtures containing those compounds is preferably no more than about 20:1. Those persons skilled in the art recognize that the actual $P_2O_5$ content in methanesulfonic acid will vary depending upon the PBZ monomer employed and desired end use for the resulting polymer. In general, mixtures containing a ratio of methanesulfonic acid to $P_2O_5$ of greater than about 5:1 are used to obtain isotropic solutions, while ratios less than 5:1 are typically used to obtain anisotropic solutions.

Electron-deficient carbon group (Q)—Any group containing an electron-deficient carbon atom which can react in a suitable dehydrating solvent with an o-amino-basic moiety to form an azole ring. Acceptable groups representative of electron-deficient carbon groups are those listed in column 24, lines 59-66 of U.S. Pat. No. 4,533,693, the teachings of which are incorporated herein by reference. Preferred electron-deficient carbon groups are carboxyls, acyl halides, acyl esters, acyl amides, anhydrides, alkali or alkaline earth metal carboxylate salts, cyano moieties and trihalomethyl moieties. The most preferred electron-deficient carbon groups are carboxyls and acyl halides. The halogen incorporated in electron-deficient carbon groups is preferably chlorine, bromine or iodine and most preferably chlorine.

Functional group—A group that functions as a reactive site during a PBZ polymerization reaction. Functional groups in a PBZ polymerization reaction are selected from the group consisting of electron-deficient carbon groups and o-amino-basic moieties as both of those terms are defined herein. Functional groups can be located on PBZ monomers, PBZ oligomers, terminating agents, branching agents, and reaction products resulting from combinations of the same.

o-Amino-basic moiety—A moiety which can react with an electron-deficient carbon group in a suitable dehydrating solvent to form an azole ring. An o-amino-basic moiety comprises two components bonded to an aromatic group. One component is a primary amine group and the second component is a -ZH group. These components are bonded to the aromatic group in a position ortho with respect to each other. The Z of the —ZH group is O, S or NR, R being selected from the group consisting of hydrogen, aliphatic groups containing up to about 12 carbon atoms, and aromatic groups containing up to about 18 carbon atoms. The —ZH group suitably comprises a hydroxy, thiol, primary amine, or secondary amine group: preferably a hydroxy or thiol group: and most preferably a hydroxy group. Where the —ZH group is a secondary amine group represented by the formula NR, R is suitably an aromatic or an aliphatic group, preferably n alkyl group. The secondary amine group preferably comprises no more than about 6 carbon atoms, more preferably no more than about 4 carbon atoms and most preferably 1 carbon atom.

PBZ monomer —An AA- , AB- and BB- monomer (as those terms are defined hereinafter) that can react in a PBZ polymerization reaction to produce a PBZ polymer. The terms AA- , AB- and BB- monomer are generally used in the art, such as in 11 *Ency. Poly. Sci. & Eng.*, previously incorporated by reference herein.

PBZ polymer—A polybenzazole (PBZ) polymer is a polymer selected from the group consisting of polybenzoxazoles and polybenzobisoxazoles (collectively referred to hereinafter as PBO): polybenzothiazoles and polybenzobisthiazoles (collectively referred to hereinafter as PBT): and polybenzimidazoles and polybenzobisimidazoles (collectively referred to hereinafter as PBI), the nomenclature of which is discussed in 11 *Ency. Poly. Sci. & Eng.*, supra, p. 601-603, previously incorporated herein by reference. For purposes of this application, the term "PBZ polymer" refers broadly to polymers comprising repeating units (herein referred to as a "mer unit") that contain an azole ring which is fused, bonded or both fused and bonded to an aromatic group. The aromatic group is not necessarily limited to a single 6-membered carbon ring. The term "PBZ polymer" also refers broadly to poly(phenylene-benzo-bis-azole)s and similar polymers wherein each mer unit comprises a plurality of azole rings fused to an aromatic group.

II. Synthesis of Branched PBZ Polymers

A branched PBZ polymer according to the present invention can be synthesized by reacting at least one branching agent with at least one PBZ monomer or a chain of PBZ mer units in a dehydrating solvent. Techniques known within the art for conducting PBZ polymerizations, such as those described within the Wolfe patents incorporated by reference herein, are in general applicable in making branched PBZ polymers. For example, a branched PBZ polymer may be formed by the condensation polymerization of at least one branching agent with at least one AB-monomer. Branched PBZ polymers may also be synthesized by reaction of at least one branching agent with a combination of at least one AA-monomer and at least one BB-monomer. Other variations will become apparent to the reader upon review of the disclosure herein.

A. Branching Agents Useful in Practicing the Invention

A branching agent comprises an organic multivalent base structure moiety with at least three azole-forming moieties randomly attached thereto. Each azole-forming moiety is capable of reacting with another azole-forming moiety on a PBZ monomer or a PBZ oligomer to form an azole ring and produce reaction products. Branching agents may also react with available azole-forming moieties on such reaction products to produce a larger molecule, and so on. Branching agents used in the reaction preferably cannot react with each other and therefore, contain functional groups consisting of either all electron-deficient carbon groups or all o-amino-basic moieties.

The choice of base structure moiety is not critical, so long as it is stable and inert with respect to the condensation polymerization reaction conditions and does not substantially interfere with azole ring forming reactions between functional groups as previously described. A suitable base structure moiety can be aliphatic, alicyclic or aromatic. Preferred base structure moieties are aromatic in nature and most preferably correspond to the description and preferred embodiments previously given for aromatic groups. Branching agents preferably have a number average molecular weight of no greater than about 500.

Each functional group on a base structure moiety will preferably react with a PBZ monomer or a PBZ oligomer such that a PBZ polymer branch is formed at the site of each functional group existing prior to polymerization. Those persons skilled in the art will recognize that some functional groups may not react during polymerization. However, it is desirable that at least three functional groups of a branching agent base structure moiety react with a PBZ oligomer to yield a branched polymer structure.

Positioning of the functional groups on the base structure moiety is not critical, as long as the positioning does not lead to reaction between adjacent functional groups when a branching agent contains both electron-deficient carbon groups and o-amino-basic moieties, or prevent reaction of a functional group. Preferred branching agents preferably have functional groups positioned equidistant from each other on the base structure moiety. Examples of preferred branching agents are 1,3,5-benzenetricarboxylic acid and 1,3,5-benzenetricarbonyl trichloride. The tetra-functional carboxylic acid depicted in Formula 2 is an example of another preferred branching agent.

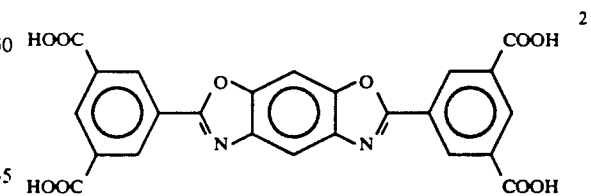

2

Additional examples of suitable branching agents are novel compounds having structures shown in Formulas 3(a)-(c) below:

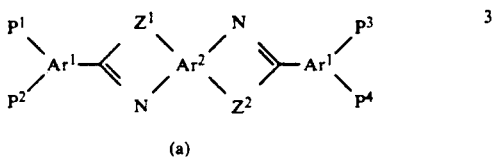

(a)

3

-continued

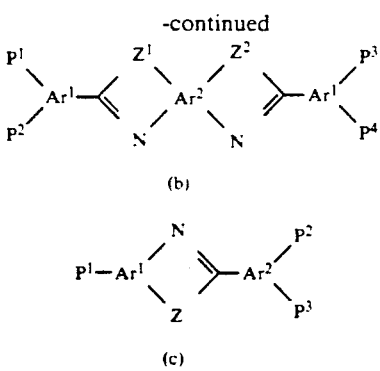

(b)

(c)

wherein:
Ar¹ is a first aromatic group;
Ar² is a second aromatic group;
P¹⁻⁴ are each functional groups; and
Z, Z¹ and Z² are each selected from O, S, or NR, where R is selected from the group consisting of hydrogen, aliphatic groups containing up to about 12 carbon atoms and aromatic groups containing up to about 18 carbon atoms. The description and preferred embodiments for Ar¹ and Ar² are those previously given for aromatic groups. The aromatic groups Ar¹ and Ar² can be the same or different, but are most preferably both single benzene rings. The description and preferred embodiments for $P_{1-4}$ correspond to those previously given for electron-deficient carbon groups and o-amino-basic moieties. The description and preferred embodiments of Z groups are those as previously described in defining o-amino-basic moieties.

Compounds 3(a) and 3(b) are formed by the reaction of a compound containing at least three azole-forming moieties with a compound containing two azole-forming moieties. Compound 3(c) is obtained by reacting an AB-monomer with a tri-functional compound.

Tetra-functional branching agents, such as those illustrated by Formula 2, can be synthesized by reacting a BB-monomer with a compound having three electron-deficient carbon groups. Examples of suitable compounds are 1,3,5-benzenetricarboxylic acid and 1,3,5-benzenetricarbonyl trichloride. The reaction is illustrated by the following equation given as an example:

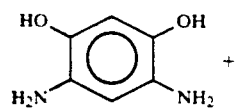

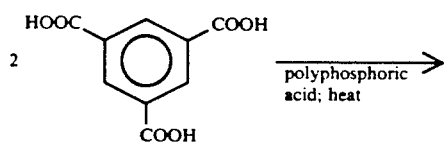

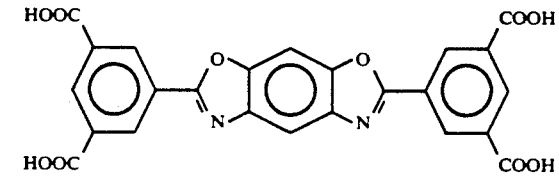

The reaction is conducted in a dehydrating solvent, such as polyphosphoric acid, using the techniques previously incorporated by reference and described hereinafter in relation to PBZ polymerization reactions. Tetra-functional branching agents corresponding to Formulas 3(a) and (b) can also be synthesized in the same manner by reacting an AA-monomer with a compound having three o-amino-basic moieties.

Those skilled in the art will recognize that the tetra-functional branching agents illustrated by Formula 3(a) and (b) are average structures. In Formula 2, for example, another BB-monomer may react with an available electron-deficient carbon group to produce a branching agent with five functional groups, and so on. However, it is believed that the illustrative reaction yields a product consisting predominantly of the tetra-functional carboxylic acid. These compounds can then be polymerized with PBZ monomers in a subsequent condensation polymerization to produce a branched PBZ polymer.

The tri-functional branching agents as shown in Formula 3(c) may be synthesized by reacting an AB-monomer with a compound having three azole-forming moieties. Examples of suitable compounds having three electron-deficient carbon groups are 1,3,5-benzenetricarboxylic acid and 1,3,5-benzenetricarbonyl trichloride. The reaction is illustrated by the following equation given as an example:

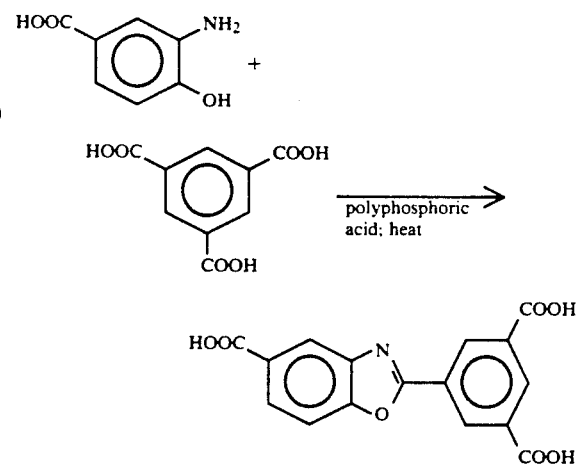

As in the reaction previously illustrated for the tetra-functional branching agents, this reaction is conducted in a dehydrating solvent, such as polyphosphoric acid, using the techniques previously incorporated by reference and as described hereinafter relating to PBZ polymerization reactions. Synthesis of a tri-functional branching agent can also be performed in the same manner by reacting an AB-monomer with a compound having three o-amino-basic moieties.

Those skilled in the art will recognize that the tri-functional branching agents illustrated by Formula 4 are average structures. For example, another AB-monomer may react with an available P group and so on. However, it is believed that the illustrative reaction set forth above yields a product consisting predominantly of the tri-functional carboxylic acid. These compounds, like the tetra-functional compounds previously described, can be polymerized with PBZ monomers to produce a branched PBZ polymer.

Persons skilled in the art will recognize that many compounds can act as a branching agent to produce the branched PBZ polymers of the present invention, provided such compounds contain appropriate functional groups and other substituents previously described which will permit reaction of the azole-forming moieties.

Each branching agent may contain substituents on the base structure moiety which are stable with respect to reagents and solvents used in the polymerization and do not interfere with reaction of the attached functional groups. Examples of suitable substituents include hydrogen, halogens, alkoxy moieties, aryloxy moieties and alkyl groups. Preferred substituents are hydrogen, halogens and alkyl groups having up to about 6 carbon atoms. Hydrogen and alkyl groups are the most preferred substituents.

Control over the degree of branching within a reaction product is necessary to obtain a branched PBZ polymer dope with sufficient ductility to allow formation of useful objects by extrusion methods described hereinafter. The degree of branching may also vary the physical properties of the resulting branched polymer. If the degree of branching is not limited, the branched PBZ polymer dope will become cross-linked and incapable of being processed into useful articles of manufacture such as fibers, films or the like. Use of an excess of branching agent will produce branched PBZ polymer dopes that, when extruded through a die, break into a fibrous non-agglomerated mass.

The degree of branching can be varied by choosing the number of functional groups on the branching agent, i.e. the branching agent's degree of functionality, by varying the amount of branching agent utilized in the polymerization, or by a combination thereof. In general, a higher degree of functionality will reduce the amount of branching agent required to obtain a desired degree of branching in the final product. Conversely, a lower degree of functionality will increase the amount of branching agent necessary to obtain the same degree of branching.

In terms of mole percentages of reactants prior to polymerization, the amount of branching agent is suitably less than about 14 mole %, but greater than about 0.05 mole %. The amount is preferably less than about 5 mole % and most preferably less than about 2 mole %.

It is believed that the length of individual PBZ polymer branches can be varied by using a branching agent having at least two different functional groups that have differing reaction rates with respect to the PBZ monomers being polymerized.

B. PBZ Monomers Useful in Practicing the Invention

Any PBZ monomer described in the Wolfe patents previously incorporated herein by reference may be used to prepare a branched PBZ polymer according to the present invention. Each monomer classification is described hereinafter.

An AB-monomer independently comprises an aromatic group (Ar) which has randomly attached thereto both an o-amino-basic moiety and an electron-deficient carbon group. The term "AB-monomer" corresponds with terminology commonly used within the art, such as that found in 11 *Ency. Poly. Sci. & Eng.*, supra. previously incorporated herein by reference. The "A" refers to electron-deficient carbon group functionality and the "B" refers to o-amino-basic functionality. The electron deficient carbon group is preferably in a position para with respect to either the primary amine group or the —ZH moiety components of the o-amino-basic moiety.

Illustrative AB-monomers are represented by Formulas 4(a) and (b) where Q and —ZH are as previously defined.

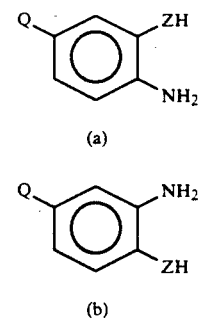

Examples of preferred AB-monomers are 3-hydroxy-4-aminobenzoic acid or 3-amino-4-hydroxybenzoic acid. Other suitable examples of AB-monomers are those listed in U.S. Pat. No. 4,533,693, columns 33–35 at Table 8, the teachings of which are incorporated herein by reference.

A BB-monomer as referred to herein comprises an aromatic group (Ar) which has bonded thereto two o-amino-basic moieties. The term "BB" is commonly used in the art and refers to the presence of two o-amino-basic moiety functional groups.

Examples of suitable BB-monomers and reference to their synthesis are found in U.S. Pat. No. 4,533,693, Table 1, columns 19–21 and Tables 2 and 3, columns 21–22 and 23–24; Lysenko, *High Purity Process for the Preparation of 4,6-Diamino-1,3-Benzenediol*, U.S. Pat. No. 4,766,244 (Aug. 23, 1988); and Inbasekaran, *Preparation of Diamino- and Dialkylaminobenzenediols*, U.S. Pat. No. 4,806,688 (Feb. 21, 1989). These examples of BB-monomers are incorporated herein by reference. BB-monomers preferably comprise a single benzene ring with the o-amino-basic moieties in a 1,2- and 4,5-position on the ring. Examples of preferred linear BB-monomers are 4,6-diaminoresorcinol and 2,5-diamino-1,4-benzenediol.

An AA- monomer comprises an intermediate moiety, as that term is defined hereinabove in relation to the term aromatic group, having bonded thereto two electron-deficient carbon groups. With respect to AA-monomers, preferred intermediate moieties are aromatic groups. The intermediate moiety itself is inert during a PBZ condensation polymerization. The term "AA" is commonly used in the art and refers to the presence of two electron-deficient carbon groups.

Examples of suitable AA-monomers and reference to their synthesis are found in U.S. Pat. No. 4,533,693 Table 4, Table 5 and Table 6 in Col. 25–32. These examples of AA-monomers are incorporated herein by reference. Examples of preferred AA-monomers are terephthalic acid, terephthaloyl chloride, 4,4'-biphenyldicarboxylic acid and 4,4'-biphenyldicarbonyl dichloride.

Monomers of the AB- and BB- types are generally stored as salts to preclude oxidative degradation of the o-amino-basic moiety functional groups. These monomers are preferably stored as hydrogen halide salts, but suitable practice is to isolate and store the monomers in the form of other mineral acid salts, such as salts of sulfuric, nitric or phosphoric acid. Certain phosphate salts are discussed in our copending application, Ser. No. 341,502. Phosphate and other mineral acid salts are discussed in the Lysenko patent, supra, at column 4, lines 40–44 and Imai et al., "Polybenzazoles", 83 *Makromol. Chem.* 179–187 (1965), the teachings of which are incorporated herein by reference.

C. Reaction of PBZ Monomers and Branching Agents According to the Invention

Techniques for reacting AB-, AA- and BB-monomers in a condensation polymerization are discussed at length in 11 *Ency. Poly. Sci. & Eng.*, supra. at 611–19, as well as U.S. Pat. Nos. 4,703,103; 4,533,724; 4,533,692; 4,533,693; and 4,578,432, the teachings of which are incorporated herein by reference.

The polymerization preferably takes place in a dehydrating solvent as that term is previously defined. A preferred dehydrating solvent is a dehydrating mineral acid such as polyphosphoric acid. If a nonrigid-rod PBZ polymer or a low molecular weight rigid-rod PBZ polymer is desired, it is believed that a nondehydrating solvent may be employed.

If a branched PBZ polymer of high molecular weight is desired in a liquid crystalline, or anisotropic solution, the $P_2O_5$ content of the polyphosphoric acid solvent may be controlled as described in U.S. Pat. No. 4,533,693, column 42, line 61 to column 45, line 62, the teachings of which are incorporated herein by reference. When a high molecular weight polymer is desired, the polyphosphoric acid initially contains at least about 73% by weight $P_2O_5$ as described hereinabove. If PBZ monomers in the form of hydrogen halide salts are employed, a lower initial $P_2O_5$ content lowers solution viscosity and reduces foaming associated with the release of hydrogen halide gas during initial stages of the polymerization, a technique typically referred to in the art as a dehydrohalogenation step. After dehydrohalogenation, the $P_2O_5$ content is preferably increased so that the $P_2O_5$ content after polymerization is at least about 80% by weight.

The condensation polymerization reaction is typically performed under an inert atmosphere, for instance under nitrogen, argon or helium, with nitrogen being preferred. The inert atmosphere is required to prevent air oxidation of AB- or BB-monomers used in the reaction.

The reaction pressure is not critical, as long as the solvent remains substantially in a liquid phase. However, pressure can be reduced during the reaction to encourage release of hydrogen halide gas formed during dehydrohalogenation of AB- and BB-monomers.

The temperature during the initial dehydrohalogenation step, if such a step is employed, should be sufficient to initiate release of hydrogen halide gas. The temperature is preferably from about 25° C. to about 100° C., and more preferably about 45° C. The preferred temperature range specified for dehydrohalogenation can be sufficient to begin the condensation polymerization reaction. Some monomers, such as terephthaloyl chloride, can sublime at higher temperatures. Therefore, when using sublimable monomers it is advantageous to have a temperature within this preferred range for a time sufficient to allow formation of PBZ oligomers and thereby reduce monomer loss by sublimation at higher temperatures. Thereafter, the temperature is preferably increased to enhance the rate of reaction.

Many monomers, such as terephthalic acid and 4,4'-bis(benzoic acid), are only slightly soluble in dehydrating solvents and therefore vigorous agitation is required to enhance dissolution of the monomer. Due to poor monomer solubility, the mixture of reactants and solvent more closely resembles a suspension rather than a true solution at lower reaction temperatures.

After dehydrohalogenation, the reaction temperature is beneficially raised to a level sufficient to promote condensation polymerization and obtain branched PBZ polymers of greater molecular weight. The reaction temperature is suitably at least about 70° C., desirably at least about 95° C., preferably at least about 150° C. and most preferably at least about 190° C. However, the maximum temperature of the reaction may be any temperature at which the polymer and solvent are stable. The maximum temperature is desirably no more than about 240° C., preferably no more than about 225° C. and most preferably no more than about 210° C. If the temperature is too low, an uneconomically long time is needed to form the desired branched PBZ polymers. Excessively high temperatures favor monomer degradation, monomer sublimation or undesired side reactions which will adversely impact molecular weight in the resulting polymer.

The time required to obtain a desired degree of polymerization varies widely depending upon the reactants and temperatures used as is known to persons of ordinary skill in the art of PBZ polymers. The reaction preferably proceeds at a temperature of from about 190° C. and 210° C. for at least about 30 minutes. A longer or shorter time period may be used if desired.

PBZ monomers used in practicing the present invention are preferably in the form of a combination of (I) at least one first monomer, i.e., an AA-monomer, and (II) at least one second monomer, i.e., a BB-monomer, as previously described.

An excess of BB-monomer yields short polymer chains forming the PBZ polymer branches with a correspondingly low molecular weight. An excess of AA-monomer in less than about a 10 mole % excess surprisingly does not substantially effect polymer molecular weight. An excess of AA-monomer greater than about 10 mole % is unnecessary and difficult to remove. In preferred embodiments of the present invention, neither the BB- nor the AA-monomer is present in more than about a 10% molar excess. These monomers are more preferably in no more than about a 5 % molar excess and most preferably no more than about a 1 % molar excess. If the reaction is performed with an excess of a monomer, the excess is preferably less than about 1 mole % of BB-monomer.

Branched PBZ polymers can be synthesized in any concentration which the dehydrating solvent is capable of dissolving. The concentration of branched polymer is suitably from about 1% by weight to about 20% by weight and preferably from about 4% by weight to about 18% by weight. Concentrations below about 1% by weight are economically undesirable. It is generally difficult to obtain concentrations in excess of 20% by weight, because of the handling problems associated with high viscosity solutions. Where polyphosphoric acid or methanesulfonic acid with added $P_2O_5$ is the dehydrating solvent, the concentration of branched PBZ polymer in the solvent is typically less than about 20% by weight. However, it is believed that the 20% limit can be exceeded by decreasing the molecular weight of the branched PBZ polymer.

The PBZ condensation reaction produces a dope comprising at least one dehydrating solvent and a branched PBZ polymer. Dopes obtained in practicing the present invention can be either isotropic or anisotropic. The dividing line between isotropic and anisotropic solutions varies with each particular branched PBZ polymer, the polymer concentration, the polymer molecular weight, the solution temperature and the solvent. In general, a dividing line between an anisotropic solution and an isotropic solution occurs at a branched PBZ polymer concentration of about 5% by weight. Concentrations below about 5% by weight generally produce isotropic solutions, while those above about 5% by weight produce anisotropic or liquid crystalline solutions. An isotropic solution is suitable for fabrication of molecular composites. An anisotropic solution is suitable for use in making fibers or films.

D. Control of the Degree of Branching and Branch Length

The degree of branching within a branched PBZ polymer and the length of PBZ polymer branches can be further controlled by addition of at least one terminating agent prior to reaching the desired degree of polymerization. The terminating agent is preferably added prior to beginning the polymerization to achieve maximum control over the degree of branching. As mentioned above, control over the degree of branching is necessary to obtain a PBZ polymer dope capable of being processed into useful articles. A terminating agent is also useful to control branch length and molecular weight. The terminating agent may further influence physical properties in the resultant branched PBZ polymer.

A terminating agent suitably comprises a base structure that has attached thereto a functional group selected from the group consisting of o-amino-basic moieties and electron-deficient carbon groups. The choice of base structure is not critical so long as it is inert with respect to the polymerization reaction. The functional group can be chosen to react with a given monomer, a group of monomers, a branching agent and so on. The choice depends upon the functional groups appearing on the given monomer or branching agent. The use of monofunctional reactants, i.e. terminating agents, in a PBZ polymerization reaction is generally discussed in U.S. Pat. No. 4,703,103 at column 41, line 25 to column 47, line 64, the teachings of which are incorporated herein by reference. Upon reaction of the functional group, the remaining portion of the terminating agent molecule not altered by the reaction becomes a terminating end group.

Examples of suitable terminating agents useful in practicing the present invention are identified in Tables 15 (a)-(c) of the U.S. Pat. No. 4,703,103 patent previously incorporated by reference herein. Preferred terminating agents are benzoic acid, benzoyl chloride, o-amino phenol, o-amino-thiophenol, and o-diaminobenzene.

The amount of terminating agent will vary widely depending upon the amounts of other reactants and the desired molecular weight of the branched PBZ polymer product. In general, it is advantageous to use less than 10 mole %. The amount is desirably less than about 5 mole % and preferably less than about 2 mole %.

III. Branched PBZ Polymers of the Invention

The branched PBZ polymers formed as a result of the reaction comprise a plurality of base structure moieties having a plurality of, preferably at least three, chain-like PBZ polymer branches bonded thereto. It is believed that branched PBZ polymers based solely upon AB-monomers are discrete entities having no interconnection or bonding with other base structure moieties or PBZ polymers. Other PBZ polymers, e.g. those produced by polymerizing a mixture of AA- and BB-monomers, may have some chemical bonding. For example, two base structure moieties may share a common AA/BB-PBZ polymer branch.

The PBZ polymer branches of the present invention suitably comprise, on average, from about 10 PBZ mer units to about 500 PBZ mer units. The branches preferably have from about 20 PBZ mer units to about 100 PBZ mer units. Each PBZ mer unit comprises:
(1) an aromatic group (Ar); and
(2) a first azole ring which is fused with the aromatic group.

Each PBZ mer unit preferably further comprises:
(3) a second azole ring which is fused with the aromatic group, and
(4) an intermediate moiety, as that term is defined herein, covalently bonded by a single bond to the 2-carbon of the second azole ring.

Each aromatic group independently has the definition and preferred embodiments previously described for aromatic groups. Each intermediate moiety independently has the definition and preferred embodiments for intermediate moieties in AA-monomers. Preferred PBZ polymer branches are those selected from the group consisting of PBO polymers and PBT polymers, as those terms are previously defined.

If the PBZ mer units have only a single azole ring per unit (referred to herein as AB-PBZ mer units), then individual mer units are preferably linked by a single bond from the 2-carbon of the azole ring to the first aromatic group of an adjacent unit. If the PBZ mer units have two azole rings per unit and an intermediate moiety (referred to herein as AA/BB-PBZ mer units), then individual units are preferably linked by a single bond from the intermediate moiety to the 2-carbon in the first azole group of an adjacent unit.

Chains of PBZ mer units comprising the branches of the present invention can be formed by reacting a mixture of AB-, AA- and BB monomers. The PBZ polymer branches formed by reacting this mixture comprise copolymer chains with randomly spaced AB-PBZ and AA/BB-PBZ mer units.

Chains of PBZ mer units can be formed by reacting a mixture of AA- and AB-monomers. This reaction is expected to place only one AA-monomer moiety within a single branch. As such, these branches should closely resemble branches formed solely from AB-monomers.

At least one AB-monomer can be reacted with at least one branching agent to form an intermediate polymer comprising branches of repeating AB-PBZ mer units. This intermediate can then be reacted with at least one AA-monomer and at least one BB-monomer to produce a branched PBZ polymer containing some branches consisting of AB-PBZ mer units and some branches consisting of a block of AB-PBZ mer units followed by a block of AA/BB-PBZ mer units.

Conversely, at least one AA-monomer, at least one BB-monomer and at least one branching agent can react to form an intermediate branched AA/BB-PBZ polymer. This intermediate can than be reacted with at least one AB-monomer to produce a branched PBZ polymer containing some branches consisting of AA/BB-PBZ mer units and some branches consisting of blocks of AA/BB-PBZ mer units followed by blocks of AB-PBZ mer units.

Many variations in the manner of reacting AB-, AA- and BB-monomers will become apparent to those skilled in the art. All of these variations are intended to come within the scope of the present invention.

Branched PBZ polymers formed in practicing the present invention suitably have a number average molecular weight of at least 5,000. The number average molecular weight beneficially ranges from 5,000 to 500,000. Molecular weights above and below this range are possible, but may not be economically advantageous. The actual molecular weight will vary depending upon the particular polymer structure synthesized and its intended end use. Those skilled in the art of PBZ polymers measure molecular weight of a PBZ polymer by its inherent viscosity when dissolved in a solvent, such as methanesulfonic acid, a technique which is generally described in 11 *Ency. Poly. Sci. & Eng.*, supra. at page 623. Branched PBZ polymers, produced in the form of an isotropic solution, suitably have an inherent viscosity of at least about 0.5 dL/g when measured at 25° C. in methanesulfonic acid and a polymer concentration of between about 0.05 g/dL and about 0.5 g/dL. Branched PBZ polymers, produced in the form of an anisotropic solution, suitably have an inherent viscosity of at least about 5 dL/g, and desirably at least about 10 dL/g, when measured at 25° C. in methanesulfonic acid and a polymer concentration of between about 0.005 and about 0.5 g/dL.

The branched PBZ polymer formed as a result of the previously described condensation reaction can be isolated from the resulting dope, as described in greater detail hereinafter, by the addition of a non-solvent for the polymer which is miscible with the dehydrating solvent. A preferred non-solvent is water when polyphosphoric acid is the dehydrating solvent.

Branched PBZ polymers of the present invention, after isolation from the dope, can be processed into powders by methods known in the art, such as coagulation of the dope in a high shear medium or grinding. Alternatively, they may be extruded as fibers and films as described hereinafter.

IV. Fabrication of Articles of Manufacture Containing Branched PBZ Polymers

The branched PBZ polymer compositions of the present invention can be fabricated into an article of manufacture, such as a fiber or film. The articles exhibit the expected high tensile modulus and tensile strength expected from PBZ polymers. Fibers and films may be formed from either isotropic or anisotropic dopes as previously described. The dopes may result from first isolating the branched polymer from a dope formed during polymerization and subsequently redissolving the polymer in another solvent which may or may not be a dehydrating solvent. The dopes are more practically the direct product of the process previously described for making branched PBZ polymers.

The branched PBZ polymer dopes are preferably degassed at elevated temperature and under reduced pressure, such as about 80° C. and about 0.4 in Hg, to remove any residual hydrogen halide gas or inert gas remaining after synthesis prior to further processing.

Fibers are spun from the degassed dopes according to techniques familiar to persons of ordinary skill in the art. See, e.g., 11 *Ency. Poly. Sci. & Eng.*, supra, at 625-28; U.S. Pat. No. 4,533,693 at columns 82-84: Hwang et al., "Solution Processing and Properties of Molecular Composite Fibers and Films," 23 *Poly. Eng. & Sci.* 784, 785 (1984): and Hwang et al., "Composites on a Molecular Level: Phase Relationships, Processing, and Properties," B22(2) *J. Macromol. Sci. & Phys.* 231, 234-35 (1983), the teachings of which are incorporated herein by reference. The dope can, for example, be forced through a temperature-controlled spinnerette by a piston, or other dope forwarding device, which extrudes the dope as a number of thin streams. Other conventional methods may be used to recover the polymer and form fibers and films therefrom.

SPECIFIC EMBODIMENTS OF THE INVENTION

The following examples illustrate the present invention and should not be construed, by implication or otherwise, as limiting the scope thereof. All parts and percentages are by weight and all temperatures are in degrees centigrade (°C.) unless otherwise indicated.

EXAMPLE 1

Preparation of Branched AA/BB-PBO Polymers

In a nitrogen environment, measured amounts of the reactants 4,6-diaminoresorcinol dihydrochloride (DAHB) (a BB-monomer), terephthaloyl chloride (TC) (an AA-monomer), and 1,3,5-benzenetricarboxylic acid (TMA) (a branching agent), and a polyphosphoric acid (PPA) dehydrating solvent containing bout 76% by weight $P_2O_5$ are loaded into a resin kettle. Amounts used for reactants and solvent in each experimental run are given in Table 1. Generally following the procedures taught by U.S. Pat. No. 4,533,693, the above-identified reactants and solvent are vigorously agitated at a temperature of about 45° C. and atmospheric pressure for approximately 16 hours. The resulting solutions are then heated to about 95° C. and $P_2O_5$ is added to the kettle in an amount as shown in Table 1. The solutions foam as hydrogen chloride gas is released and turn yellow in color. The reactions continue at atmospheric pressure with agitation for about 24 hours at 95° C., a subsequent 24 hours at 150° C., and a final 24 hours at 190° C. The resulting dopes for each run are stored under a nitrogen atmosphere until needed.

To measure inherent viscosity ($\eta_{inh}$) in each run, the respective branched polymer is isolated by coagulating the dope produced in the run in a water bath. The product is dried, acid extracted with water in a Soxhlet extractor, ground to a fine powder, reextracted with water, and given a final drying at about 170° C. and 3.0 mm Hg. The dried, branched polymer product is dissolved at room temperature in methanesulfonic acid to obtain a solution having a concentration of about 0.05 g/dL. The inherent viscosity of the solution at 25° C. is measured in a Schott-Gerate CT 150 bath in an Ubelhobde tube. The inherent viscosity shown for the polymer synthesized in each run is shown in Table 1.

TABLE 1

Experimental Data For AA/BB-PBO Polymer Synthesis

| Experimental Run | DAHB (g) | DAHB (mmol) | TC (g) | TC (mmol) | TMA (g) | TMA (mmol) | PPA (g) | P₂O₅ Added (g) | ηinh dL/g |
|---|---|---|---|---|---|---|---|---|---|
| A | 10.00 | 46.9 | 9.52 | 46.9 | 0.07 | 0.3 | 42.9 | 28.9 | 17.0 |
| B | 116.10 | 545 | 110.99 | 547 | 0.464 | 2.21 | 498.0 | 335.5 | 21.3 |
| C | 10.00 | 46.9 | 9.56 | 47.1 | 0.04 | 0.2 | 45.4 | 26.4 | 12.0 |
| D | 10.00 | 46.9 | 9.56 | 47.1 | 0.04 | 0.2 | 42.9 | 28.9 | 23.4 |

EXAMPLE 2

Preparation of Branched AB-PBO Polymers

In a nitrogen atmosphere, measured amounts of the reactants 3-amino-4-hydroxybenzoic acid hydrochloride monohydrate (AHB) (an AB-monomer) and 1,3,5-benzenetricarboxylic acid (TMA) and a polyphosphoric acid (PPA) solvent containing about 76% by weight $P_2O_5$ are loaded into a resin kettle. The measured amounts of reactants and solvent used for two experimental runs are given in Table 2. After heating and agitating the reactants and solvent for about 16 hours at 45° C., an added amount of $P_2O_5$ is introduced into the kettle. The resulting solutions are reacted according to the procedure used in Example 1. The inherent viscosity, measured according to the procedure used in Example 1, is shown in Table 2.

TABLE 2

Experimental Data for AB-PBO Polymer Synthesis Using Trimesic Acid as a Branching Agent

| Experimental Run | AHB (g) | AHB (mmol) | TMA (g) | TMA (mmol) | PPA (g) | P₂O₅ Added (g) | ηinh (dL/g) |
|---|---|---|---|---|---|---|---|
| A | 59.24 | 286 | 1.00 | 4.76 | 103.0 | 105.2 | 3.08 |
| B | 29.62 | 143 | 1.00 | 4.76 | 48.7 | 55.3 | 2.20 |

EXAMPLE 3

Preparation of Branched AB-PBO Polymers with a Different Branching Agent

To illustrate the use of another compound as a branching agent, the procedure of Example 2 is duplicated with the exception of reagent amounts. A 0.10 g (0.38 mmoles) amount of 1,3,5-benzenetricarbonyl trichloride as a branching agent, a 25.00 g (120.5 mmoles) amount of 3-amino-4-hydroxybenzoic acid hydrochloride monohydrate (an AB-monomer) and 24.3 g of a polyphosphoric acid dehydrating solvent with a $P_2O_5$ content of about 77% by weight are introduced into a resin kettle. Upon heating to 95° C., 38.4 g of added $P_2O_5$ is introduced to the kettle as in the previous runs The inherent viscosity measured as in Example 1 for the resulting polymer is 10.0 dL/g.

EXAMPLE 4

Preparation of Branched PBO Polymers With Branches Consisting of Blocks of AA/BB-PBO and AB-PBO Mer Units In a nitrogen environment, a solution is formed by loading and mixing in a resin kettle 10.00 g (46.94 mmoles) of 4,6-diaminoresorcinol dihydrochloride (a BB-monomer), 9.56 g (47.08 mmoles) of terephthaloyl chloride (an AA-monomer) and 4.18 g of the branched AB-PBO polymer dope prepared in Example 2B. The branched AB-PBO polymer synthesized in Example 2B has branches consisting of, based upon a calculated average, of about 10 PBO mer units. The above-described mixture of reactants and solvent is reacted following the procedure used in Example 1. The polymer is isolated from the dope and the inherent viscosity measured according to the procedures used in Example 1. The measured inherent viscosity is 19.7 dL/g.

EXAMPLE 5

Replication of Example 4 Based upon Material Prepared in Example 2A

The procedure of Example 4 is replicated for experimental runs A and B, except for deviation in procedure with respect to conducting the later stages of the reaction for run B in a piston reactor. In runs A and B, the AB-PBO dope used is that prepared in Example 2A. The branched AB-PBO polymer synthesized in Example 2A has branches consisting of a calculated average of about 20 PBO mer units.

After about two hours at 150° C. for sample run B, the contents of the resin kettle are transferred to a piston reactor where the reaction is continued and the dope is spun into fiber. The amount of reactants and solvent used for both sample runs, as well as measured inherent viscosities are set forth in Table 3.

TABLE 3

Experimental Data For PBO Polymers Synthesized with Blocks of AA/BB-PBO and AB-PBO Mer Units

| Experimental Run | DAHB (g) | DAHB (mmol) | TC (g) | TC (mmol) | AB-PBO dope (g) | AB-PBO (mmol) | PPA (g) | P₂O₅ Added (g) | ηinh dL/g |
|---|---|---|---|---|---|---|---|---|---|
| A | 7.50 | 35.2 | 7.17 | 35.3 | 7.83 | 0.141 | 33.3 | 20.6 | 26.6 |
| B | 115.00 | 539.75 | 109.94 | 541.5 | 120.06 | 2.17 | 510.6 | 315.9 | 19.0 |

The data shown in Table 3 illustrate preparation of a branched PBZ polymer with a AB-PBO block connected to an AA/BB-PBO block. Similar results are expected with other compositions disclosed hereinabove.

EXAMPLE 6

Preparation of Branched PBO Polymers with Mono-Functional Terminating Agents In a nitrogen environment, measured amounts of the reactants 4,6-diaminoresorcinol dihydrochloride (DAHB), terephthaloyl chloride (TC), 1,3,5-benzenetricarboxylic acid (TMA), benzoic acid (BA) and a polyphosphoric acid (PPA) dehydrating solvent containing about 76% by weight $P_2O_5$ are loaded into a resin kettle. Amounts used for reactants and solvent in each experimental run are given in Table 4. The resulting solutions are reacted as in Example 1. The inherent viscosities of the polymers are measured as in Example 1 and are given in Table 4.

TABLE 4

Experimental Data For Synthesis of Branched PBO Polymers Using Benzoic Acid as a Terminating Agent

| Experimental Run | DAHB (g) | DAHB (mmol) | TC (g) | TC (mmol) | TMA (g) | TMA (mmol) | BA (g) | BA (mmol) | PPA (g) | $P_2O_5$ Added (g) | $\eta_{inh}$ dL/g |
|---|---|---|---|---|---|---|---|---|---|---|---|
| A | 10.00 | 46.94 | 9.50 | 46.79 | 0.086 | 0.41 | 0.050 | 0.41 | 43.1 | 28.7 | 12.3 |
| B | 10.00 | 46.94 | 9.50 | 46.79 | 0.086 | 0.41 | 0.150 | 1.23 | 43.1 | 28.7 | 8.14 |
| C | 7.50 | 35.21 | 6.58 | 32.39 | 0.148 | 0.704 | 0.086 | 0.704 | 34.1 | 19.8 | 4.28 |
| D | 10.00 | 46.94 | 9.37 | 45.71 | 0.040 | 0.20 | 0.073 | 0.60 | 42.9 | 28.9 | 12.5 |
| E | 115.00 | 540 | 109.25 | 538 | 0.989 | 4.71 | 0.575 | 4.71 | 521.8 | 304.0 | 10.6 |
| F | 116.10 | 544.9 | 110.99 | 546.7 | 0.464 | 2.21 | 0.270 | 2.21 | 500.7 | 333.0 | 12.4 |

The data shown in Table 4 illustrate the use of mono-functional terminating agents in a branched PBZ polymerization.

EXAMPLE 7

Preparation of Tetra-Functional Branching Agents

In a nitrogen environment, a solution is formed by loading into a 100 ml resin kettle, and thereafter mixing, 2.00 g (18.77 mmoles) of 4,6-diaminoresorcinol dihydrochloride and 3.94 g (37.55 mmoles) of 1,3,5-benzenetricarboxylic acid in 46.2 g of a polyphosphoric acid dehydrating solvent with a $P_2O_5$ content of about 76% by weight. The mixture is agitated at 45° C. and atmospheric pressure for about 16 hours. The solution is then heated to about 95° C. and 25.0 g of $P_2O_5$ is added. The reaction continues at atmospheric pressure under a nitrogen environment with agitation at 95° C. for about 8 hours, and subsequently at 150° C. and atmospheric pressure for about 16 hours giving rise to a brown/amber solution. A portion of the product is precipitated in a water bath and repeatedly washed with water to remove residual solvent. The precipitate is dried to a constant weight in a vacuum oven at about 50° C.

The beige/yellow product is believed to be predominately a tetra-functional carboxylic acid having the average structure as illustrated in Formula 2. The structure is confirmed by infrared spectrophotometer analysis showing absorption bands associated with the carboxylic acid and the azole moieties. This tetra-functional carboxylic acid can be used as a branching agent for making branched PBZ polymers.

EXAMPLE 8

Preparation of Branched PBO Polymers Using Tetra-Functional Branching Agents In a nitrogen environment, a solution is formed by loading into a 2 liter resin kettle, and thereafter mixing, 115.0 g (0.5398 moles) of 4,6-diaminoresorcinol dihydrochloride, 106.72 g (0.5257 moles) of terephthaloyl chloride, 0.521 g (4.27 mmoles) of benzoic acid, 1.055 g (2.16 mmoles) of the tetra-functional carboxylic acid synthesized in Example 7, and 515.1 g of a polyphosphoric acid dehydrating solvent with a $P_2O_5$ content of about 76% by weight. The mixture is agitated with a mechanical stirrer at 45° C. and atmospheric pressure for about 16 hours. The resulting solution is then heated to about 95° C. and 310.7 g of $P_2O_5$ is added. The solution turns a bright yellow and foams as hydrogen chloride gas is released. The reaction continues at 95° C. and atmospheric pressure for 24 hours and subsequently at about 150° C. and a 0.5 mm Hg vacuum for an additional 3 hours. At this point, the contents of the kettle are transferred to a piston reactor as in Example 5 to complete the reaction and spin the resulting dope into fiber.

A portion of the fiber is extracted overnight with water in a Soxhlet extractor and then dried at 170° C. and 3.0 mm Hg. The fiber is then dissolved in methanesulfonic acid to obtain a solution of 0.044 g/dL. The inherent viscosity is measured at 25° C. in a Schott-Gerate CT 150 bath with an Ubelhobde tube as 14.6 dL/g.

COMPARATIVE EXAMPLE A

Preparation of Branched PBO Polymers with Larger Amounts of Branching Agent

Incorporation of an excess amount of branching agent within the polymerization reaction can lead to production of a non-ductile polymer which cannot be formed into a fiber or film. The following comparative sample runs are illustrative.

In a nitrogen environment, a solution is formed by loading into a 100 ml resin kettle, and thereafter mixing, 7.50 g (35.2 mmoles) of 4,6-diaminoresorcinol dihydrochloride, 6.44 g (31.7 mmoles) of terephthaloyl chloride, 0.37 g (1.76 mmoles) of 1,3,5-benzenetricarboxylic acid, 0.21 g (1.76 mmoles) of benzoic acid and 33.5 g of a polyphosphoric acid dehydrating solvent having a $P_2O_5$ content of about 77% by weight. The resulting solution is reacted as in Example 1, with agitation at 45° C. and atmospheric pressure for about 16 hours. The solution is then heated to 95° C., at which time 20.3 g of $P_2O_5$ is added giving a bright yellow, opaque solution and foaming due to release of hydrogen chloride gas. The solution is, at atmospheric pressure, reacted at 95° C. for about 8 hours, 150° C. for an additional 16 hours and finally 190° C for about 24 hours. The resulting polymer dope appears bright green in color, rubbery and non-fiber forming. The polymer is isolated from the dope by coagulation in a water bath with the extraction and drying steps described in Example 1. The resulting branched polymer product does not readily dissolve in methanesulfonic acid, thereby suggesting that the polymer is cross-linked.

The procedure is repeated using 120.00 g (0.56 moles) of 4,6-diaminoresorcinol dihydrochloride. 114.24 g (0.56 moles) of terephthaloyl chloride, 0.840 g (4.00 mmoles) of 1,3,5-benzene-tricarboxylic acid and 517.5 g of a polyphosphoric acid dehydrating solvent having a $P_2O_5$ content of about 76% by weight. After heating to about 95° C. at atmospheric pressure, 344.2 g of $P_2O_5$ is added. The resulting solution is then heated to about 150° C. for two hours and the contents of the kettle are transferred to the piston reactor as in Example 5 to complete polymerization and spin fiber. However, after approximately one hour, the piston could not operate within the polymer dope and the dope could not be spun into fibers, suggesting what is believed to be the development of a crosslinked system or an undesirably high molecular weight polymer. The polymer is isolated from the dope as in Example 1. The resulting polymer is soluble in methanesulfonic acid with the inherent viscosity measured as in Example 1 to be 22.1 dL/g.

The comparative runs suggest that the presence of an excess amount of branching agent produces a polymer dope unsuitable for spinning into fiber.

What is claimed is:

1. A process for making a branched polybenzazole polymer comprising contacting, in the presence of at least one dehydrating solvent and under conditions sufficient to form a branched polybenzazole polymer, at least one polybenzazole monomer with at least one branching agent, the at least one polybenzazole monomer and the at least one branching agent being present in amounts sufficient to form a branched polybenzazole polymer, each polybenzazole monomer containing at least two azole-forming moieties and being cable of forming a polybenzazole polymer in a condensation polymerization reaction, each branching agent comprising a base structure moiety having bonded thereto at least three azole-forming moieties, each of which, when reached with an azole-forming moiety from a polybenzazole monomer, forms an azole ring, the at least one branching agent being present in an amount which will produce a branched polybenzazole polymer substantially free of cross-linking.

2. The process of claim 1 wherein the at least one polybenzazole monomer comprises a mixture of (I) at least one first monomer and (II) at least one second monomer, the at least one first monomer comprising an intermediate bridging group having bonded thereto two electron-deficient carbon groups and the at least one second monomer comprising an aromatic group having bonded thereto two o-amino-basic moieties.

3. The process of claim 2 wherein the at least one first monomer is selected from the group consisting of terephthalic acid, terephthaloyl chloride, 4,4'-biphenyldicarboxylic acid, 4,4'-biphenyldicarbonyl dichloride and mixtures thereof.

4. The process of claim 2 wherein the at least one second monomer is selected from the group consisting of 4,6-diaminoresorcinol, 2,5-diamino-1,4-benzenediol and mixtures thereof.

5. The process of claim 2 wherein the at least one first monomer and the at least one second monomer are present in the mixture at no more than about a 10% molar excess of either monomer.

6. The process of claim 2 wherein the mixture further comprises at least a third monomer comprising an aromatic group having attached thereto both an o-amino-basic moiety and an electron-deficient carbon group.

7. The process of claim 1 wherein the at least one branching agent is selected from the group consisting of 1,3,5-benzenetricarboxylic acid, 1,3,5-benzenetricarbonyl trichloride, and mixtures thereof.

8. The process of claim 1 wherein the amount of the at least one branching agent is from about 0.05 mole % to about 14 mole % of all reactants prior to polymerization.

9. The process of claim 8 wherein the amount of the at least one branching agent is less than about 2 mole %.

10. The process of claim 1 wherein the dehydrating solvent is selected from the group consisting of methanesulfonic acid, methanesulfonic acid with added phosphorous pentoxide, trifluoromethyl sulfonic acid, polyphosphoric acid and mixtures thereof.

11. The process of claim 1 wherein the conditions include a temperature of at least about 50° C.

12. The process of claim 11 wherein the temperature is from about 150° C. to about 240° C.

13. The process of claim 1 wherein at least one terminating agent is admixed with the at least one polybenzazole monomer and the at least one branching agent.

14. The process of claim 1 wherein contact is conducted for a time sufficient to produce a dope comprising the branched polybenzazole polymer in an amount of from about 2.5% to about 20% by weight of the dope.

15. The process of claim 1 wherein the branched polybenzazole polymer produced has a measured inherent viscosity of at least about 0.5 dL/g when measured at 25° C. in methanesulfonic acid.

16. The process of claim 1 wherein the branched polybenzazole polymer produced has a measured inherent viscosity of at least about 5.0 dL/g when measured at 25° C. in methanesulfonic acid.

17. The process of claim 1 wherein the branched polybenzazole polymer produced is selected from the group consisting of branched polybenzoxazole, polybenzobisoxazole, polybenzothiazole, and polybenzobisthiazole polymers.

18. A branched polybenzazole polymer comprising at least one branching agent base structure moiety having a plurality of polybenzazole polymer branches bonded thereto, the polybenzazole polymer being substantially free of cross-linking.

19. The branched polybenzazole polymer of claim 18 wherein on average at least three polybenzazole polymer branches are bonded to a branching agent base structure moiety.

20. The branched polybenzazole polymer of claim 18 wherein the polybenzazole polymer branches are selected from the group consisting of branched polybenzoxazole, polybenzobisoxazole, polybenzothiazole, and polybenzobisthiazole polymers.

21. An article of manufacture comprising the branched polybenzazole polymer of claim 18.

22. A dope comprising at least one solvent and the branched polybenzazole polymer of claim 18.

* * * * *